United States Patent [19]

Gardner et al.

[11] Patent Number: 4,657,663

[45] Date of Patent: Apr. 14, 1987

[54] HYDROTREATING PROCESS EMPLOYING A THREE-STAGE CATALYST SYSTEM WHEREIN A TITANIUM COMPOUND IS EMPLOYED IN THE SECOND STAGE

[75] Inventors: Lloyd E. Gardner; Robert J. Hogan; Edward L. Sughrue, II; John W. Myers, all of Bartlesville, Okla.

[73] Assignee: Phillips Petroleum Company, Bartlesville, Okla.

[21] Appl. No.: 726,759

[22] Filed: Apr. 24, 1985

[51] Int. Cl.$^4$ .................. C10G 65/04; B01J 23/74
[52] U.S. Cl. .................. 208/210; 208/217; 208/251 H; 208/254 H; 502/309; 502/314; 502/315; 502/322; 502/323; 502/335; 502/351
[58] Field of Search ............ 208/210, 254 H, 251 H, 208/89, 217; 502/309, 350, 314, 315, 322, 323, 335, 351

[56] References Cited

U.S. PATENT DOCUMENTS

| | | | |
|---|---|---|---|
| 2,903,413 | 9/1959 | Folkins et al. | 208/57 |
| 3,168,461 | 2/1965 | Russell et al. | 208/89 |
| 3,184,403 | 5/1965 | Gardner et al. | 208/89 |
| 3,291,723 | 12/1966 | Blue | 208/210 |
| 3,362,901 | 1/1968 | Szepe et al. | 208/210 |
| 3,556,984 | 1/1971 | Van Driesen | 208/59 |
| 3,725,251 | 4/1973 | Alpert et al. | 208/210 |
| 3,766,058 | 10/1973 | Hensley, Jr. | 208/210 |
| 3,770,618 | 11/1973 | Adams et al. | 208/216 |
| 3,907,667 | 9/1975 | Murphy et al. | 208/58 |
| 3,968,027 | 7/1976 | Frayer et al. | 208/210 |
| 4,016,067 | 4/1977 | Fischer et al. | 208/89 |
| 4,018,714 | 4/1977 | Wilson et al. | 502/309 |
| 4,054,508 | 10/1977 | Milstein et al. | 208/89 |
| 4,116,817 | 9/1978 | Frayer et al. | 208/210 |
| 4,133,777 | 1/1979 | Frayer et al. | 502/309 |
| 4,173,528 | 11/1979 | Frayer et al. | 208/210 |
| 4,212,729 | 7/1980 | Hensley, Jr. et al. | 208/210 |
| 4,302,323 | 11/1981 | Chen | 208/89 |
| 4,306,964 | 12/1981 | Angevine | 208/210 |
| 4,415,436 | 11/1983 | Angevine | 208/89 |
| 4,431,525 | 2/1984 | Hensley, Jr. et al. | 208/251 H |
| 4,465,790 | 8/1984 | Quayle | 502/309 |
| 4,490,479 | 12/1984 | Vogel et al. | 502/309 |
| 4,510,046 | 4/1985 | Parrott | 208/254 H |

OTHER PUBLICATIONS

Advertisement for Ketjenfine ® 840 Catalysts, Hensley et al, "Effects of Catalyst Properties and Process Conditions on the Selectivity of Resid Hydroprocessing", HDS-69, pp. 728–736.

Primary Examiner—Andrew H. Metz
Assistant Examiner—Anthony McFarlane
Attorney, Agent, or Firm—Mark A. Montgomery

[57] ABSTRACT

The catalytic hydrotreating of a residual oil-containing feedstream is carried out in a multi-catalyst bed in which the feedstream is first contacted with a catalyst bed which comprises of alumina, cobalt, molybdenum and nickel. The feedstream is then contacted with a second catalyst bed which contains a catalyst comprising alumina to which molybdenum, titanium and nickel have been added, followed by a third catalyst bed which contains a catalyst comprising alumina to which molybdenum and nickel have been added.

15 Claims, No Drawings though subject to distillation at atmospheric pressure or under vacuum, are generally called "residual stocks" or simply "resids." It is desirable to subject such resids to conditions of hydrodesulfurization, hydrodenitrogenation and/or hydrodemetallization prior to further processing, such as cracking, in order to convert the resids into higher valued products.

HYDROTREATING PROCESS EMPLOYING A THREE-STAGE CATALYST SYSTEM WHEREIN A TITANIUM COMPOUND IS EMPLOYED IN THE SECOND STAGE

This invention relates to hydrotreating of hydrocarbon streams. In particular it relates to catalytic hydrotreating. It also relates to the treating of residual oils.

The increased demand for premium fuels, such as gasoline, diesel fuel, jet fuel, etc., coupled with the diminishing reserves of high-grade, sweet crude oils has dictated that the petroleum industry use greater proportions of heavier, lower quality, higher-sulfur containing crude oils in their operations in order to meet the needs of consumers. In addition to increased amounts of sulfur, many of the readily available crudes also contain increased quantities of metal compounds such as nickel and vanadium compounds, nitrogen compounds and polycyclic hydrocarbons, such as asphaltenes. These undesirable components are generally found in the higher boiling components of the crudes and, hence, tend to become concentrated during distillation of the crude in the higher boiling fractions, particularly the bottoms fractions. These bottoms, unvaporized liquids remaining after distillation at atmospheric pressure or under vacuum, are generally called "residual stocks" or simply "resids." It is desirable to subject such resids to conditions of hydrodesulfurization, hydrodenitrogenation and/or hydrodemetallization prior to further processing, such as cracking, in order to convert the resids into higher valued products.

Hydrodesulfurization is a process intended primarily to convert the sulfur in organic sulfur compounds to hydrogen sulfide. Hydrodenitrogenation is a process intended primarily to convert the nitrogen in organic nitrogen compounds to ammonia. Hydrodesulfurization and hydrodenitrogenation will generally occur at the same time under similar process conditions if both organic sulfur compounds and organic nitrogen compounds are present in the feed stream. The hydrogen sulfide and/or ammonia can be removed from the feed stream after the hydrodesulfurization and/or hydrodenitrogenation process. Hydrodesulfurization and hydrodenitrogenation are processes which are typically utilized to remove sulfur and nitrogen from hydrocarbon-containing feedstocks which are used to produce fuels which, when burned, will meet environmental standards. The processes can be applied to feed streams other than hydrocarbon-containing feeds if organic sulfur compounds and/or organic nitrogen compounds are present and the removal of sulfur and/or nitrogen is desired.

The earliest hydrodesulfurization and/or hydrodenitrogenation catalyst were bauxite and Fuller's earth. Later, catalysts containing cobalt and molybdenum oxides on alumina and nickel and tungsten oxides on alumina substantially replaced the earlier catalyst and these catalysts are still used very extensively. Another effective catalyst is a catalyst composition comprising cobalt, molybdenum, zinc, titanium and catalytic grade alumina disclosed in U.S. Pat. No. 4,287,050.

Hydrodemetallization is a process intended primarily to remove metals from a feed stream. Metals, such as vanadium and nickel, make further processing of the heavy fractions difficult since the metals generally act as poisons for catalysts employed in processes such as catalytic cracking. Hydrodemetallization has been accomplished in the past using a wide variety of metallic catalysts under conditions of temperature and pressure and in the presence of hydrogen to selectively deposit the metals or metal-containing compounds on the surface of the catalyst. Hydrodemetallization is sometimes unintentionally and undesirably accomplished, e.g., in hydrodesulfurization where the metals in the feed are deposited on the hydrodesulfurization catalyst resulting in deactivation and poisoning of the catalyst.

Prior processes have utilized multi-catalyst beds. These beds contain usually two or more catalysts, each of which, if used alone, would be suitable for specific reactions, for example demetallization and/or desulfurization. Combinations of different catalysts are used for complete hydrotreating processes.

It is thus an object of this invention to provide a process for the hydrotreatment, i.e., hydrodemetallization, hydrogenation, hydrodesulfurization and/or hydrodenitrogenation of a mixture of resids.

Another object of this invention is to provide a process for hydrotreating resids utilizing a combination catalyst that improves over prior art combination catalysts.

Another object of this invention is to protect downstream catalyst from being poisoned.

Other objects and advantages of the invention will be apparent from the foregoing brief description of the invention and the appended claims, as well as the detailed description of the invention which follows.

SUMMARY OF THE INVENTION

In accordance with the present invention, a multi-catalyst bed is utilized in a hydrotreating (hydrodemetallization, hydrogenation, hydrodesulfurization and/or hydrodenitrogenation) process to treat a residual oil containing freedstream. The portion of the multi-catalyst bed with which the feed stream is first contacted contains a catalyst comprising alumina, promoted with a relatively low amount of molybdenum, cobalt and nickel. The second portion of the multi-catalyst bed through which the feed stream is passed after passing through the first portion contains a catalyst comprising alumina to which a relatively large amount of molybdenum and nickel and titanium have been added. The third portion of the multi-catalyst bed contains an alumina catalyst promoted by nickel and molybdenum. This combination of catalyst can operate at lower process temperatures than prior art catalyst, thereby extending the life of the catalysts. The hydrotreating process is carried out under suitable conditions to result in substantial activity for hydrodemetallization, hydrogenation, hydrodesulfurization and/or hydrodenitrogenation.

The use of the third catalyst is particularly helpful in reducing the operating temperature of this three catalyst bed system. This is surprising because vendors of this catalyst recommended that this catalyst not be used in this system because residual oil would quickly foul the catalyst and it would become useless. This has not been found to be true, however.

DETAILED DESCRIPTION OF THE INVENTION

Any suitable organic sulfur compound contained in the resids can be hydrodesulfurized in accordance with the present invention. Suitable organic sulfur compounds can include sulfides, disulfides, mercaptans, thiophenes, benzothiophenes, dibenzothiophenes and mixtures thereof.

Any suitable organic nitrogen compound contained in the resids can be hydrodenitrogenated in accordance with the present invention. Suitable organic nitrogen compounds can include amines, diamines, pyridines, pyrroles, quinolines, prophyrins, benzoquinolines and mixtures thereof.

The catalyst composition which is employed in the first catalyst bed is a conventional hydrodesulfurization and/or hydrodemetallization catalytic grade alumina catalyst which is supplied by a number of catalyst vendors. The metallic components, cobalt, molybdenum and nickel will typically but not necessarily be present in the oxide form. The concentration of cobalt in such catalyst is typically in the range of about 0.5 weight percent to about 2 weight percent based on the weight of the total catalyst composition. The concentration of molybdenum is generally in the range of about 7 weight percent to about 10 weight percent based on the weight of the total catalyst composition. The concentration of nickel in the catalyst will generally range from 0.5 to about 2 weight percent based on the weight of the total catalyst composition. Ranges of pertinent properties of the first catalyst composition are density: 0.5–0.7 g/cc; pore volume (mercury porosimetry, 15 Kpsi Hg): 0.5–0.9 cc/g; surface area (BET/$N_2$): 150–200 $m^2$ g; average pore diameter (calculated from pore volume and surface area using the formula 4 PV/SA): 130–180 Å.

The catalyst composition employed in the second catalyst bed is a calcined composition comprising catalytic grade alumina to which the metallic components, molybdenum, nickel and titanium, have been added. Molybdenum, nickel and titanium will generally, but not necessarily, be present in the oxide form. The concentration of molybdenum in such catalyst composition is typically in the range of about 6 to about 12 weight percent based on the weight of the total catalyst composition. The concentration of nickel is typically in the range of about 2 to about 5 weight percent of the total catalyst composition. The concentration of titanium is typically in the range of about 3 to about 10 weight percent based on the total catalyst composition. Ranges of pertinent properties of the second catalyst composition are: density: 0.4–0.8 g/cc; pore volume (15 Kpsi Hg): 0.6–0.8 g/cc; surface area (BET/$N_2$): 120–180 $m^2/g$; and average pore diameter: 10–150 Å.

The third catalyst employed is a composition comprising alumina optionally containing 1–5 weight percent phosphorus, promoted by nickel and molybdenum. The metallic components here will also, typically, but not necessarily, be in the oxide form. The concentration of nickel in this catalyst is typically in the range of about 2 weight percent to about 6 weight percent, based on the weight of the total catalyst composition, but preferably between about 3 and about 4 weight percent. The molybdenum component will be present in an amount ranging from about 5 weight percent to about 20 weight percent based on the weight of the total catalyst composition, but preferably between about 8 and about 14 weight percent. Ranges of pertinent properties of the third catalyst composition are: density: 0.7–1.0 g/cc; pore volume (15 Kpsi Hg): 0.4–0.6 g/cc; surface area (BET/$N_2$): 100–200 $m^2/g$; and average pore diameter: 50–150 Å.

Any alumina known in the art can be utilized including the forms of catalytic grade alumina known as eta- or gamma-alumina, having appropriate density, pore volume and surface area so as to provide the above-specified ranges of these parameters in the first, second and third catalyst compositions.

Any suitable compound of the metallic catalyst components can be used to form the catalyst composition.

Nickel or cobalt compounds suitable for use are the nitrate, sulfate, carbonate, oxalate, oxide, and mixtures of two or more thereof.

Molybdenum compounds suitable for use are ammonium molybdate, ammonium heptamolybdate, sodium molybdate, molybdenum oxides such as molybdenum (IV) oxide and molybdenum (VI) oxide and the like and mixtures of two or more thereof.

Titanium compounds suitable for use are $Ti(OC_3H_7)_4$ and $TiCl_4$.

The catalyst components can be prepared by any method known in the art. The nickel, cobalt, titanium and molybdenum can be added individually or simultaneously by impregnating the alumina with a solution—aqueous or organic—of a soluble compound of the metal. The catalytic grade alumina can be 1/32" or larger extrudate, preferably about 1/20" extrudate, although this is not required. After the metallic components have been added to the catalytic grade alumina, the wet catalyst composition is filtered or drained, and optionally washed, to remove excess solutes, e.g., sulfates or halides, before proceeding to the drying step. After drying to remove essentially all the solvent, a solution of another metallic component can be added by impregnation if all metallic components were not added in the first impregnation step. After all of the metallic components have been added, the catalyst composition is calcined in the presence of a free oxygen containing gas (e.g., air) at a temperature in the range of about 500° C. to about 600° C. until volatile matter is removed and the metallic components are substantially converted to their oxides. The time required for the calcining step may range from about 0.1 to about 10 hours.

The catalysts are preferably presulfided before use or can be sulfided during the hydrodesulfurization process. In the refinery, presulfiding is generally done by using gas oil feeds often spiked with sulfur compounds along with hydrogen. On the other hand, in laboratory work presulfiding is usually accomplished by using a gas mixture of $H_2$ and $H_2S$.

In the scope of this invention, any hydrocarbon-containing feedstock can be treated with the multiple catalyst bed system of this invention. However, this invention is particularly suitable for hydrocarbon-containing feedstocks comprising resids containing high levels of sulfur compounds, nitrogen compounds and metal compounds.

Typical resids useful in this invention are heavy petroleum fractions produced in atmospheric or vacuum distillation operations. These resids generally have an initial boiling point (at atmospheric pressure) of at least about 400° F., particularly at least about 650° F. Some resids such as those produced by vacuum distillation can have an initial boiling point of about 750° F. Generally these resids contain about 10–1000 ppmw, particularly about 25–200 ppmw, of nickel plus vanadium; about 0.5–6 weight percent, particularly about 2–6 weight percent, of sulfur and about 0.05–2 weight percent, particularly 0.2–1 weight percent, of total nitrogen. Generally the API gravity (at 60° F.) ranges from about 5 to about 30, particularly from about 10 to about 20.

The process of this invention can be carried out by means of any apparatus whereby there is achieved a contact with the catalysts and the mixture of resid to be hydrotreated. The process is in no way limited to the use of a particular apparatus. The process of this invention can be carried out using a fixed catalyst bed or moving catalyst bed. Presently preferred is a fixed catalyst bed.

The catalyst beds can be in physical contact or can be separated. In general, it is not necessary to add anything to or take anything from the process stream flowing from one catalyst bed to another catalyst bed. The present invention is described in terms of using one reactor containing all catalyst beds but the invention is applicable to using three separate reactors. The process conditions are generally the same in each reactor, if three are used. The relative amounts of each of the three catalyst compositions can range from about 10 to about 80 weight percent, preferably from about 20 to about 50 weight percent, based on the sum of the weights of the three catalyst compositions.

Any suitable temperature for hydrotreatment of the mixture of resid in the reactor can be utilized. The temperature will generally be in a range of about 550° to about 850° F. and will more preferably be in the range of about 650° to about 750° F. for the hydrodemetallization, hydrodesulfurization and/or the hydrodenitrogenation process.

To maintain the activity of the catalyst, generally the temperature of the hydrotreatment process is gradually increased to compensate for loss of catalyst activity due to fouling of the catalysts.

Any suitable pressure for the hydrotreatment of the mixture of resid in the reactor can be utilized. In general, the pressure will be in the range of about 200 to about 3000 psia total system pressure. The total system pressure is the sum of the partial pressure of the feedstock plus the partial pressure of the added hydrogen. Preferably, the total system pressure will be in the range of from about 1500 to about 2500 psia.

Any suitable quantity of hydrogen can be added to the hydrotreatment process. The quantity of hydrogen used to contact the feedstock will be in the range from about 1000 to about 10,000 SCF/bbl and will more preferably be in the range from about 2000 to about 4000 SCF/bbl.

Any suitable residence time for the feedstock in the reactor can be utilized. In general, the residence time in terms of the liquid hourly space velocity (LHSV) (volumes of liquid per total volume of catalysts per hour) can range from an LHSV of about 0.1 to about 4 and will more preferably range from about 0.2 to about 2 for the hydrotreatment process. The term "total volume of catalysts" means the combined volume of the first, second and third catalysts.

The following examples are presented in further illustration of the invention.

EXAMPLE I

In this example, the automated experimental setup for investigating the demetallization, desulfurization and denitrogenation of heavy oils in accordance with the present invention is described. Oil feed was pumped downward through an induction tube into a trickle bed reactor, 28.5 inches long and 0.75 inches in diameter. The oil pump used was a Whitey Model LP 10 (a reciprocating pump with a diaphragm-sealed head; marketed by Whitey Corp., Highland Heights, Ohio). The oil induction tube extended into a stacked, three-layer catalyst bed (located about 3.5 inches below the reactor top).

Pertinent promoting metal components and properties of five commercial alumina-based catalysts employed in hydrofining tests are listed in Table I.

Hydrogen gas was introduced into the reactor through a tube that concentrically surrounded the oil induction tube but extended only as far as the reactor top. The reactor was heated with a Thermcraft (Winston-Salem, N.C.) Model 211 3-zone furnace. The reactor temperature was measured in the catalyst bed at three different locations by three separate thermocouples embedded in an axial thermocouple well (0.25 inch outer diameter). The liquid product oil was generally collected every day for analysis. The hydrogen gas was vented. Vanadium and nickel contents were determined by plasma emission analysis; sulfur content was measured by X-ray fluorescence spectrometry; nitrogen content was measured in accordance with ASTM D3228; and Ramsbottom carbon residue was determined in accordance with ASTM D524.

TABLE I

| | Catalyst A[1] | Catalyst B[1] | Catalyst C[2] | Catalyst D[3] | Catalyst E[4] |
|---|---|---|---|---|---|
| Cobalt[5], wt % | 0.9 | — | 2.4 | — | — |
| Nickel[5], wt % | 0.5 | 3.1 | — | 2.8 | 3.6 |
| Molybdenum[5], wt % | 7.5 | 7.9 | 6.7 | 11.6 | 13.2 |
| Titanium[5], wt % | — | 5–8 | — | — | — |
| Alumina | balance | balance | balance | balance[9] | balance[9] |
| Surface Areas, m²/g | 174 | 140 | 288 | 185 | 130 |
| Pore Volume[7], g/cc | 0.63 | 0.60 | 0.50 | 0.45 | 0.50 |
| Aver. Pore Diameter[8], Å | 140 | 125 | 60 | 60 | 115 |
| Density, g/cc | 0.61 | 0.75 | 0.63 | 0.81 | 0.83 |

[1]Marketed by Harshaw Chemical Company, 23800 Mercantile Road, Beachwood, Ohio 44122
[2]Marketed by American Cyanamid Company, P.O. Box 845, Houston, Texas 77001
[3]Marketed by Armak Catalyst Division of Akzona, Inc., 13000 Bay Park Road, Pasadena, Texas 77507.
[4]Marketed by American Cyanamid Company, primarily used for hydrodenitrogenation.
[5]Present as oxides.
[6]Determined by the BET/N² method.
[7]Determined by mercury porosimetry at 15 Kpsi, essentially in accordance with the procedure described by American Instrument Company, Silver Springs, Maryland, Catalog Number 5-7125-13.
[8]Calculated: 4 × pore volume surface area + surface area.
[9]Also contains about 2–4 weight percent P.

EXAMPLE II

This example illustrates the results of two hydrofining runs using two different stacked, three-layer catalyst beds.

Control Run 1 employed a stacked catalyst bed comprising a top layer of 23.5 cc (14.3 g) of Catalyst A plus 23.5 cc (about 48 g) of 30 grit Alundum alumina (surface area: less than 1 m²/g; marketed by Norton Chemical Process Products, Akron, Ohio), a middle layer of 23.5 cc (17.5 g) of Catalyst B plus 23.5 cc of Alundum, and a bottom layer of 23.5 cc (14.8 g) of Catalyst C plus 23.5 cc of Alundum. A 4.5 inch high layer of Alundum was placed on top of the Catalyst A layer, and a 2.5 inch high layer of Alundum was placed below the Catalyst C layer.

Invention Run 2 employed a top layer of 23.5 cc of Catalyst A plus 23.5 cc of Alundum, a middle layer of 23.5 cc of Catalyst B plus 23.5 cc of Alundum, and a bottom layer of 23.5 cc (19.3 g) of Catalyst D plus 23.5 cc of Alundum. A 3 inch high layer of Alundum was placed on top of the Catalyst A layer, and a 2.5 inch high layer of Alundum was placed below the Catalyst D layer.

Both stacked beds were presulfided by purging with $N_2$ for 30 minutes, heating in $H_2$ to 400° F. during a one-hour period, heating in a mixture of $H_2$ (about 0.46 SCF/min) and $H_2S$ (about 0.05 SCF/min) at 400° F. for about 28 hours, then raising the temperature to 700° F. in $H_2/H_2S$ during a one-hour period, heating in $H_2/H_2S$ at 700° F. for about 28 hours, cooling in $H_2/H_2S$ to room temperature, and purging with $N_2$.

The oil feed in both runs was a 650F+ Arabian Light Crude residuum containing 3.0 weight-% sulfur, 0.16 weight-% nitrogen, 7.7–7.8 weight-% Ramsbottom carbon residue (CR), 11–12 ppm (parts per million by weight) nickel, 36–42 ppm vanadium, and having an $API^{60}$ gravity of 16.5–16.6. Process conditions in both runs were 630°–730° F., 2250 psig, 3500 SCF/B (standard cubic feet per barrel) $H_2$, LHSV of oil: 0.35 cc/cc catalyst/hour. Total run time was about 220 hours. Hydrofining results for both runs are summarized in Table II.

TABLE II

| Temp. (°F.) | 630 | 650 | 670 | 690 | 710 | 730 | 690 |
|---|---|---|---|---|---|---|---|
| % Removal of S: | | | | | | | |
| Run 1 (Control) | 69.9 | 77.5 | 83.4 | 88.4 | 90.4 | 94.0 | 85.8 |
| Run 2 (Invention) | 71.3 | 80.4 | 85.8 | 90.9 | 92.6 | 94.6 | 89.2 |
| % Removal of N: | | | | | | | |
| Run 1 (Control) | — | 16.0 | 32.1 | 37.0 | 46.9 | 63.0 | 26.5 |
| Run 2 (Invention) | — | 48.1 | 55.6 | 63.3 | 73.5 | 80.2 | 53.1 |
| % Removal of CR: | | | | | | | |
| Run 1 (Control) | 43.4 | 47.9 | 53.7 | 62.8 | 68.5 | 77.0 | 56.6 |
| Run 2 (Invention) | 44.5 | 51.8 | 58.8 | 66.8 | 72.9 | 78.2 | 62.1 |
| % Removal of Ni + V: | | | | | | | |
| Run 1 (Control) | 59.6 | 67.7 | 76.1 | 84.6 | 89.3 | 94.4 | 81.0 |
| Run 2 (Invention) | 68.5 | 75.2 | 80.3 | 87.9 | 92.2 | 94.4 | — |
| API Gravity: | | | | | | | |
| Run 1 (Control) | 22.0 | 22.8 | 23.4 | 24.3 | 25.5 | 27.1 | 23.7 |
| Run 2 (Invention) | 22.4 | 23.4 | 24.2 | 25.2 | 26.0 | 27.4 | 24.6 |

Data in Table II show that the removal of sulfur, nitrogen, Ramsbotton carbon residue and metals (Ni, V), and the API gravity (at 60° F.) of the treated product were consistently higher in invention run 2 (with catalysts A+B+D) than in control run (with catalysts A+B+C). As shown in Table I (Example I), catalyst C contains Co and Mo, whereas catalyst D contains Ni and Mo as promoters.

EXAMPLE III

In this example the results of two hydrofining runs using a Hondo 400F+ heavy residuum containing 5.3–5.4 weight-% S, 0.71–0.78 weight-% nitrogen, 9.4–10.0 weight-% Ramsbottom carbon residue (CR), 93–95 ppm nickel, 236–248 ppm vanadium, and having an $API^{60}$ gravity of 13.6. In control Run 3, a stacked bed with Catalysts A, B and C (arranged and presulfided essentially in accordance with the procedure for Run 1 in Example II) was employed. In invention Run 4, a stacked bed with catalysts A, B and D (arranged and presulfided in accordance with the procedure for Run 2 in Example II) was employed. Run time was 110 hour for Run 3 and 270 hours for Run 4. Process conditions for Run 3 and 4 were essentially the same as for Runs 1 and 2 (Example II). Hydrofining results for both runs are summarized in Table III.

TABLE III

| Temp. (°F.) | 650 | 675 | 700 | 725 | 750 |
|---|---|---|---|---|---|
| % Removal of S: | | | | | |
| Run 3 (Control) | 77.3 | 88.2 | 95.0 | 98.0 | 99.1 |
| Run 4 (Invention) | 82.6 | 91.9 | 94.9 | 98.3 | 99.0 |
| % Removal of N: | | | | | |
| Run 3 (Control) | 40.9 | 56.8 | 70.8 | 76.8 | 86.0 |
| Run 4 (Invention) | 60.4 | 81.5 | 88.2 | 95.2 | 96.7 |
| % Removal of CR: | | | | | |
| Run 3 (Control) | 42.8 | 59.0 | 76.1 | 82.0 | 92.6 |
| Run 4 (Invention) | 59.2 | 70.6 | 85.8 | 95.7 | 98.5 |
| % Removal of Ni + V: | | | | | |
| Run 3 (Control) | 78.0 | 87.1 | 95.5 | 98.2 | 98.9 |
| Run 4 (Invention) | 79.7 | 89.7 | 94.2 | 99.2 | 99.5 |
| API Gravity: | | | | | |
| Run 3 (Control) | 22.9 | 25.1 | 27.9 | 29.6 | 32.0 |
| Run 4 (Invention) | 25.7 | 28.9 | 32.3 | 36.1 | 38.4 |

Data in Table III confirm the results of Example II, namely consistently higher removal of S, N, carbon residue and metals (Ni, V), and higher $API^{60}$ gravity of the treated product in invention Run 4 (with catalysts A+B+D) than in control Run 3 (with catalysts A+B+C).

EXAMPLE IV

In this example the results of hydrofining Hondo 400F+ resid (see Example III) at 675° F., 0.35 LHSV of the oil feed, 3500 SCF/B $H_2$ and 2250 psig, over a period of 9–10 days are compared for (a) Run 3 using a stacked bed of presulfided catalysts A, B and C (see Example III) and (b) Run 5 using a stacked bed of presulfided catalysts A, B and E (23.5 cc of each catalyst plus 23.5 cc of Alundum in each layer). As is shown in Table I of Example I, catalyst E was Ni/Mo-promoted (as was catalyst D), whereas catalyst C was promoted with Co/Mo. Hydrofining results of a product obtained after 9–10 days on stream are summarized in Table IV.

TABLE IV

| | Run 3 (Control) | Run 5 (Invention) |
|---|---|---|
| % Removal of S | 83.7 | 85.1 |
| % Removal of N | 44.4 | 54.6 |
| % Removal of CR | 58.3 | 60.3 |
| % Removal of Ni + V | 84.1 | 88.8 |
| % Removal of 1000F+ | 32.5 | 37.4 |

Data in Table IV show the superior performance of the stacked bed of catalysts A+B+E vs. that of catalysts A+B+C. These data confirm results of Example II and III.

EXAMPLE V

This example illustrates the desulfurization and denitrogenation performance of two stacked, 3-layer catalyst beds in extended runs. Process conditions were 0.33–0.36 LHSV of the oil feed, pressure was 2250 psig, $H_2$ flow was 4800 SCF/B; the feed was an Arabian Heavy 650F+ residue having about 4.0 weight-% S and about 0.28 weight-% N. The operating temperature was adjusted so as to produce a treated oil that has approximately the same sulfur content. Results are summarized in Table V.

TABLE V

| Catalyst Bed (Sulfided) | Run 6 (Control) 38 Vol % A 35 Vol % B 27 Vol % C | | Run 7 (Invention) 38 Vol % A 35 Vol % B 27 Vol % D | |
|---|---|---|---|---|
| Run Time (Days) | Temp. (°F.) | Wt % S in Product | Temp. (°F.) | Weight % S in Product |
| 33 | 750 | 0.43 | 735 | 0.36 |
| 36 | 755 | 0.36 | 735 | 0.42 |
| 37 | 755 | 0.39 | 740 | 0.34 |
| 38-39 | 760 | 0.38 | 742 | 0.31 |
| 43 | 760 | 0.29 | 740 | 0.34 |
| 50 | 765 | 0.34 | 750 | 0.34 |
| 56 | 770 | 0.33 | 751 | 0.35 |
| 57 | 770 | 0.41 | 750 | 0.29 |

Data in Table V show that the operating temperature for the desulfurization of the feed to a level of about 0.3-0.4 weight-% S required an operating temperature for invention run 7 that consistently was 15°-20° F. lower than for control run 6. Said lower operating temperature would translate to a significant savings in energy costs in commercial hydrofining runs and would also contribute to the extension of catalyst life because of lower initial rates of coke formation on the catalyst.

We claim:

1. A catalyst bed system comprising:
   (a) a first catalyst in a first catalyst bed consisting essentially of alumina promoted with about 0.5 to about 2 weight percent cobalt, about 7 to about 10 weight percent molybdenum, and about 0.5 to about 2 weight percent nickel, based on the total weight of said first catalyst, followed by
   (b) a second catalyst in a second catalyst bed consisting essentially of alumina promoted with about 6 to about 12 weight percent molybdenum, about 2 to about 5 weight percent nickel, and about 3 to about 10 weight percent titanium, based on the total weight of said second catalyst, which is followed by
   (c) a third catalyst in a third catalyst bed consisting essentially of alumina promoted with about 2 to about 6 weight percent nickel, and about 5 to about 20 weight percent molybdenum, based on the total weight of said third catalyst.

2. A catalyst bed system of claim 1 where said third catalyst comprises about 3 to about 4 weight percent nickel and about 8 to about 14 weight percent molybdenum, based on the total weight of said third catalyst.

3. A catalyst bed system of claim 1 where each of said three catalysts is present in an amount ranging from about 10 to about 80 weight percent, based on the sum of the weights of the three catalysts.

4. A catalyst bed system of claim 3 where each of said three catalysts is present in an amount ranging from about 20 to about 50 weight percent, based on the sum of the weights of the three catalysts.

5. A catalyst system according to claim 1 wherein the average pore diameter of the first catalyst bed is in the range of about 130-180 angstroms, the average pore diameter of the second catalyst is within the range of about 100-150 angstroms and the average pore diameter of the third catalyst is within the range of about 50-150 angstroms.

6. A catalyst bed system according to claim 1 wherein the third catalyst also contains from about 1 to about 5 weight percent phosphorous.

7. A process for the catalytic hydrotreating of a residual oil-containing feedstock comprising the use of a catalyst bed system comprising:
   (a) a first catalyst in a first catalyst bed consisting essentially of alumina promoted with about 0.5 to about 2 weight percent cobalt, about 7 to about 10 weight percent molybdenum, and about 0.5 to about 2 weight percent nickel, based on the total weight of said first catalyst, followed by
   (b) a second catalyst in a second catalyst bed consisting essentially of alumina promoted with about 6 to about 12 weight percent molybdenum, about 2 to about 5 weight percent nickel, and about 3 to about 10 weight percent titanium, based on the total weight of said second catalyst, which is followed by
   (c) a third catalyst in a third catalyst bed consisting essentially of alumina promoted with about 2 to about 6 weight percent nickel, and about 5 to about 20 weight percent molybdenum, based on the total weight of said third catalyst,
   wherein said feedstock is first contacted with said first catalyst bed, then with said second catalyst bed, and then with said third catalyst bed under suitable hydrotreating conditions.

8. A process according to claim 7 where said hydrotreating conditions in each bed are:
   (a) a temperature ranging from about 550° F. to about 850° F.,
   (b) a pressure ranging from about 200 psia to about 3,000 psia,
   (c) hydrogen present in an amount ranging from about 1,000 to about 10,000 SCF/bbl and,
   (d) a liquid hourly space velocity ranging from about 0.1 to about 4 volumes of liquid per total volume of catalysts per hour.

9. A process according to claim 8 where said hydrotreating conditions in each bed are:
   (a) a temperature ranging from about 650° F. to about 750° F.,
   (b) a pressure ranging from about 1,500 psia to about 2,500 psia,
   (c) hydrogen present in an amount ranging from about 2,000 to about 4,000 SCF/bbl and,
   (d) a liquid hourly space velocity ranging from about 0.2 to about 2 volumes of liquid per combined volume of catalysts per hour.

10. A process according to claim 7 wherein the average pore diameter of the first catalyst is in the range of about 130-180 angstroms, the average pore diameter of the second catalyst is within the range of about 100-150 angstroms and the average pore diameter of the third catalyst is within the range of about 50-150 angstroms.

11. A process according to claim 7 wherein the third catalyst also contains from about 1-5 weight percent phosphorous.

12. A process according to claim 7 wherein said residual oil-containing feedstock contains high levels of at least one compound selected from the group consisting of sulfur compounds, nitrogen compounds, and metal compounds.

13. A process according to claim 12 wherein the feedstock contains about 10-1000 ppmw of nickel plus vanadium, about 0.5-6 weight percent sulfur, and about 0.05-2 weight percent total nitrogen.

14. A catalyst bed system consisting essentially of:
(a) a first catalyst in a first catalyst bed of alumina promoted with about 0.5 to about 2 weight percent cobalt, about 7 to about 10 weight percent molybdenum, and about 0.5 to about 2 weight percent nickel, based on the total weight of said first catalyst, followed by
(b) a second catalyst in a second catalyst bed of alumina promoted with about 6 to about 12 weight percent molybdenum, about 2 to about 5 weight percent nickel, and about 3 to about 10 weight percent titanium, based on the total weight of said second catalyst, which is followed by
(c) a third catalyst in a third catalyst bed of alumina promoted with about 2 to about 6 weight percent nickel, and about 5 to about 20 weight percent molybdenum, based on the total weight of said third catalyst.

15. A process for the catalytic hydrotreating of a residual oil-containing feedstock comprising the use of a catalyst bed system consisting essentially of:

(a) a first catalyst in a first catalyst bed of alumina promoted with about 0.5 to about 2 weight percent cobalt, about 7 to about 10 weight percent molybdenum, and about 0.5 to about 2 weight percent nickel based on the total weight of said first catalyst, followed by
(b) a second catalyst in a second catalyst bed of alumina promoted with about 6 to about 12 weight percent molybdenum, about 2 to about 5 weight percent nickel, and about 3 to about 10 weight percent titanium, based on the total weight of said second catalyst, which is followed by
(c) a third catalyst in a third catalyst bed of alumina promoted with about 2 to about 6 weight percent nickel, and about 5 to about 20 weight percent molybdenum, based on the total weight of said third catalyst,
wherein said feedstock is first contacted with said first catalyst bed, then with second catalyst bed, and then with said third catalyst bed under suitable hydrotreating conditions.

* * * * *